United States Patent [19]

Kirkpatrick et al.

[11] Patent Number: 5,220,378
[45] Date of Patent: Jun. 15, 1993

[54] OPTICAL ARRANGEMENT ESPECIALLY SUITABLE FOR USE IN A HIGH SPEED MULTI-MAGNIFICATION PHOTOFINISHING PRINTER

[75] Inventors: David H. Kirkpatrick; Jack C. DeMarti, Jr., both of Rochester, N.Y.

[73] Assignee: Eastman Kodak Company, Rochester, N.Y.

[21] Appl. No.: 871,410

[22] Filed: Apr. 21, 1992

[51] Int. Cl.$^5$ .............................. G03B 27/70
[52] U.S. Cl. ...................... 355/60; 355/43; 355/54; 355/65; 355/66; 355/57
[58] Field of Search .......... 355/43, 45, 46, 54, 355/60, 65, 66, 57

[56] References Cited

U.S. PATENT DOCUMENTS

| Re. 26,771 | 1/1970 | Schwardt et al. | |
|---|---|---|---|
| 3,507,576 | 4/1970 | Linde | 355/57 |
| 3,512,462 | 5/1970 | Moyroud | |
| 3,574,295 | 4/1971 | Tasaki | |
| 3,837,743 | 9/1974 | Amemiya | 355/60 |
| 4,424,534 | 1/1984 | Nagane | 358/287 |
| 5,006,886 | 4/1991 | Suzuki | 355/46 |

Primary Examiner—Monroe H. Hayes
Attorney, Agent, or Firm—Ronald Reichman; Stephen C. Shear

[57] ABSTRACT

A high speed multi-magnification photofinishing printer for selectively projecting images onto a projection plane containing photographic paper at a plurality of different magnifications is disclosed herein. This printer includes means for supporting a given image bearing photographic negative, means cooperating with the negative for producing a given image bearing light beam, and a plurality of spaced apart but fixed magnification lenses, each of which is designed to project the given image bearing light beam onto the photographic paper contained within the projection plane at different magnifications. The printer also includes light beam position altering means for selectively and alternatively causing the image bearing light beam to pass through any one of the plurality of fixed magnification lenses and onto the photographic paper, whereby to selectively and alternatively project the image bearing light beam onto the paper at one of the different magnifications. As disclosed, this light beam position altering means is comprised of an array of planar mirrors fixedly mounted on a movable carriage in a particular way.

19 Claims, 2 Drawing Sheets

OPTICAL ARRANGEMENT ESPECIALLY SUITABLE FOR USE IN A HIGH SPEED MULTI-MAGNIFICATION PHOTOFINISHING PRINTER

TECHNICAL FIELD

The present invention relates generally to an optical arrangement for selectively projecting images onto a projection plane in a plurality of different ways, and more particularly to a specifically designed optical arrangement especially suitable for use as part of an overall high speed multi-magnification photofinishing printer for selectively projecting images onto a projection plane containing photographic paper at a plurality of different magnifications.

BACKGROUND ART

A high speed multi-magnification photofinishing printer requires several different magnification lenses in order to selectively project images onto a projection plane containing photographic paper at different magnifications. Moreover, each of these magnification lenses must be selectively but rapidly moved into and out of its proper operating position. To the knowledge of applicants, there have been no typical ways this has been accomplished heretofore.

SUMMARY OF THE INVENTION

The present invention is directed to an optical arrangement for selectively projecting images onto a projection plane in a plurality of different ways, specifically an arrangement which is especially suitable for use as part of an overall high speed multi-magnification photofinishing printer. As will be described in more detail hereinafter, this arrangement includes means for supporting a given image bearing member, for example, a given photographic negative, means cooperating with the image bearing member for producing a given image bearing light beam, and a plurality of spaced apart lens means, for example, magnification lenses. Each of these lens means is designed to project the image bearing light beam onto a projection plane containing, for example, photographic paper in ways that are different from one another, for example, at different magnifications.

In accordance with the present invention, the plurality of lens means are supported in fixed positions. Because the lenses of the present arrangement remain stationary, the present arrangement is provided with light beam position altering means specifically designed in accordance with the present invention to selectively and alternatively cause the image bearing light beam to pass through any one but only one of the plurality of fixed lens means and onto the projection plane, whereby to selectively and alternatively project the image bearing light beam onto the projection plane in any of a number of different ways. Moreover, this is accomplished in a rapid and yet reliable way without having to resort to a relatively expensive apparatus.

In the particular embodiment illustrated, the approach taken is to provide a carriage or slide, hereinafter merely referred to as a carriage, means for moving the carriage along a straight line path between a plurality of different positions, and an array of planar mirrors fixedly supported on the carriage such that the lines formed by the intersections of the planes containing these mirrors are parallel and are also parallel with the straight line path of movement of the carriage. As will be seen, these mirrors cooperate with the beam in different ways when the carriage is in different positions for selectively and alternatively causing the image bearing light beam to pass through any one of the plurality of fixed lens means and onto the projection plane. As will also be seen, as a result of the parallel relationship between the array of planar mirrors and the straight line path of movement of the carriage as defined immediately above, movement of the latter between its various positions does not have to be entirely accurate and therefore the means provided for moving the carriage can be relatively inexpensive. Moreover, because the position change may be less accurate, it can also potentially be faster, reducing cycle time and increasing the productivity of the printer or other such device.

BRIEF DESCRIPTION OF THE DRAWINGS

The present invention will be described in more detail hereinafter in conjunction with the drawings, wherein.

DETAILED DESCRIPTION

Figure 2:
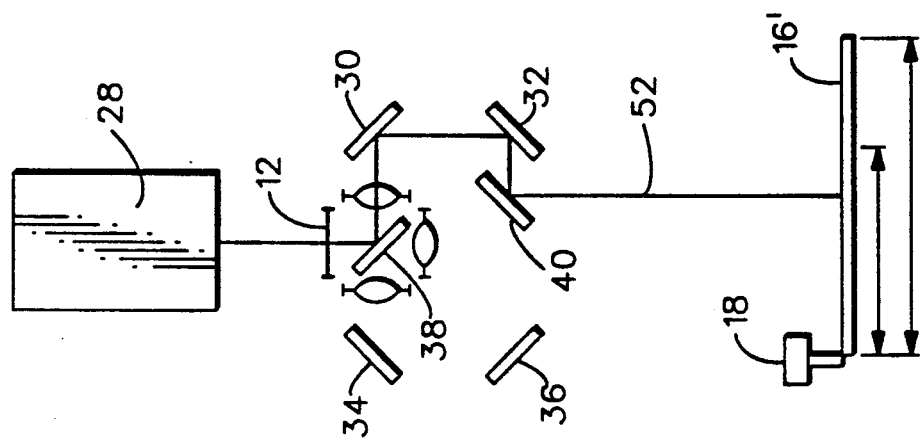
FIG. 2 diagrammatically illustrates the photofinishing printer of FIG. 1 in a second operating condition.
Figure 1:
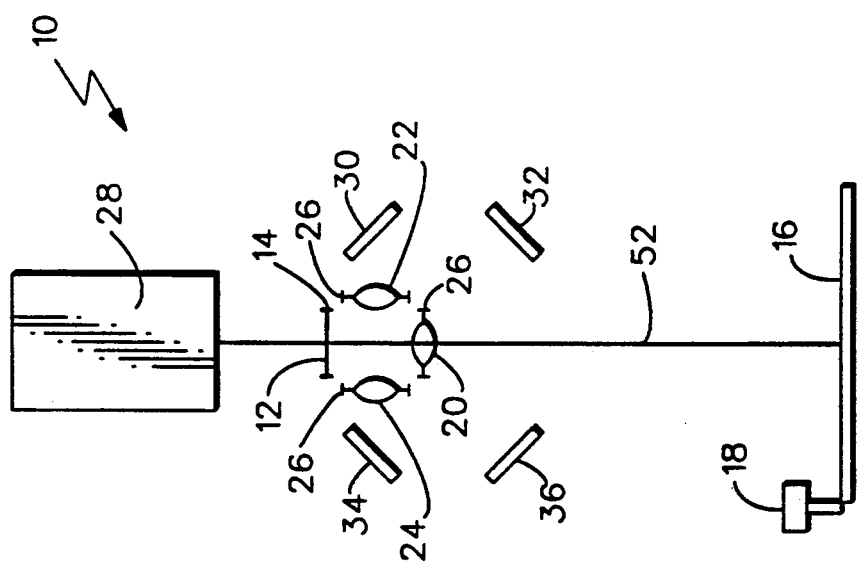
FIG. 1 diagrammatically illustrates a high speed multi-magnification photofinishing printer designed in accordance with the present invention and shown in a first operating condition.
Figure 3:
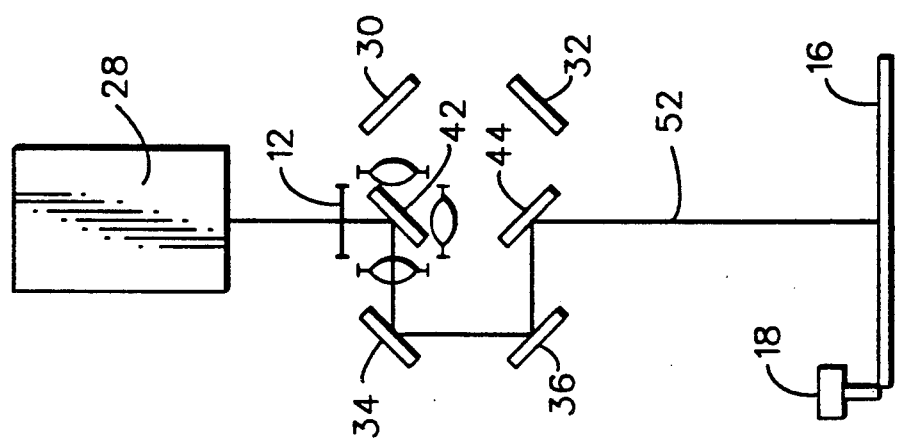
FIG. 3 diagrammatically illustrates the photofinishing printer of FIG. 1 in a third operating condition.

Turning now to the drawings, wherein like components are designated by like reference numerals throughout the various figures, a high speed multi-magnification photofinishing printer constructed in accordance with the present invention is illustrated in FIGS. 1-3 and generally designated by the reference numeral 10. As is well known, a device of this type is provided for selectively and alternatively projecting an image from a photographic negative onto a projection plane containing photographic paper at a number of different magnifications, specifically three different magnifications in the case of printer 10. The photographic negative indicated at 12 is shown in a fixed position by suitable and readily provided support means 14. The photographic paper is illustrated at 16 along with a cooperating punch 18 which is mounted in place along the left-hand edge of paper 16, as viewed in FIGS. 1-3.

As indicated immediately above, photofinishing printer 10 is specifically designed to alternatively and selectively project the image from negative 12 onto photographic paper 16 at three different magnifications. To this end, the printer includes three different magnification lenses 20, 22 and 24. In accordance with the present invention, these three magnification lenses are fixedly supported in the positions illustrated in FIGS. 1-3 by suitable and readily providable support means generally indicated at 26. Note specifically that the lens 20 is oriented directly downward, lens 22 is oriented toward the right, and lens 24 is oriented towards the left. The reason for this fixed relationship between the lenses will become apparent hereinafter.

In addition to fixed lenses 20, 22 and 24, printer 10 includes a suitable lamp 28 fixedly mounted in place by suitable means (not shown) directly over photographic negative 12, and four mirrors 30, 32, 34 and 36 fixedly mounted in the positions illustrated by suitable and readily providable means (not shown). The function of these four fixed mirrors will also become apparent hereinafter.

Figure 4:
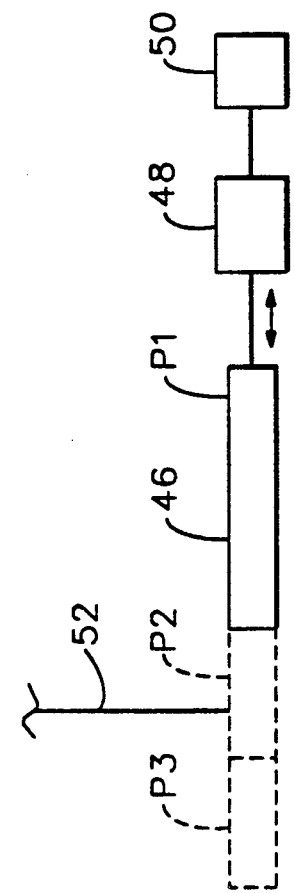
FIG. 4 diagrammatically illustrates a light beam position altering arrangement which is designed in accordance with the present invention and which forms part of the printer illustrated in FIGS. 1-3.

All of the components of printer 10 thus far described remain in fixed positions relative to one another, as indicated above. In addition to these components, printer 10 includes a first pair of movable mirrors 38 and 40 (see FIG. 2) and a second pair of movable mirrors 42 and 44 (see FIG. 3). Both pairs of movable mirrors are fixedly supported on a movable carriage 46 which is illustrated in FIG. 4. This carriage is suitably mounted on tracks or otherwise supported for rapid back and forth movement along a straight line path between three different positions, a first retracted position indicated by solid lines at P1, a second intermediately extended position indicated by dotted lines at P2 and a third fully extended position indicated by dotted lines at P3. Suitable and readily providable means 48 including, for example, a stepping motor and support structure, is provided for rapidly moving the carriage 46 back and forth between its three positions, P1, P2 and P3. This movement is controlled by suitable control circuitry 50 which also forms part of the overall printer and which is under the control of the printer's operator.

For purposes of simplicity, neither movable mirror pair 38, 40 nor movable mirror pair 42, 44 is actually shown fixedly supported on carriage 46. Nevertheless, it is to be understood that both pairs of mirrors are supported on the carriage in particular positions and the carriage is movable relative to the rest of the printer, as will be described below. Returning to FIG. 1, lamp 28 is shown directing a beam of light downward through photographic negative 12, thereby providing an image bearing light beam which is generally designated by the reference numeral 52. Actually only the centerline of this beam is shown for purposes of simplicity. In FIG. 1, the printer is shown projecting image bearing light beam 52 onto photographic paper 16 at a first magnification level. To this end, carriage or slide 46 is placed in its P1 position laterally to one side of the beam so as not to intercept the latter. As a result, the image bearing beam is allowed to pass freely through the first magnification lens 20 which appropriately projects the beam onto paper 16 at its associated first magnification. Note that the photographic paper is appropriately centered with the oncoming beam.

Turning to FIG. 2, the printer 10 is shown selectively and alternatively projecting the image from negative 12 onto photographic paper 16, at a second magnification. In this case, carriage 46 is moved to its P2 position which places mirrors 38 and 40 in their respective positions shown in FIG. 2. Note specifically that the mirror 38 intercepts the image bearing beam after the latter exits the photographic negative 12 and redirects it through the second projection lens 22. The beam, after passing through this latter projection lens, is successively reflected by mirrors 30 and 32 onto mirror 40 which ultimately directs the image bearing beam onto photographic paper 16' at a second magnification associated with second magnification lens 22. Note specifically that photographic paper 16' is wider than paper 16 but is nevertheless centered with the oncoming beam. Also note that the segment of beam 52 projected onto photographic paper 16' from mirror 40 is parallel with but offset from the segment of beam 52 exiting negative 12. This is accomplished by appropriate orientation of the mirrors, making it possible for paper 16' to be larger than paper 16 but share a common edge. Thus, only the position of the right-hand edge of the paper changes with size, thereby allowing the punch 18 to remain fixed at the common edge.

Turning now to FIG. 3, printer 10 is shown projecting the image from negative 12 onto photographic paper 16 at a third magnification. To this end, carriage 46 is moved to its P3 position, thereby placing the movable mirrors 42 and 44 in their respective positions shown in FIG. 3. With these mirrors so positioned, it can be seen that mirror 42 intercepts the image bearing beam 52 immediately after the latter passes through the negative 12 and redirects the beam through third magnification lens 24. The beam is then successively reflected by mirrors 34 and 36 onto movable mirror 44 which redirects the image bearing beam onto photographic paper 16 at a third magnification associated with third magnification lens 24. Note again that the photographic paper is centrally located with respect to the oncoming beam and that the punch 18 remains fixed in place.

Having described the three different operating modes of printer 10, it is important to note certain details that are important to the present invention. Specifically, it should be noted that all four of the movable mirrors 38, 40 and 42, 44 are planar mirrors which lie in planes oriented such that the lines formed by the intersections of these planes are parallel to one another and are also parallel with the straight line path of movement of carriage 46. Stated another way, the motion vector of the carriage lies in the planes of all of the moving mirrors. These mirrors move back and forth between the three positions P1, P2 and P3 entirely within their own respective planes. With the way in which the printer is illustrated in FIGS. 1-3, this motion vector extends into and out of the plane of the paper while at the same time, the centerline of the image bearing beam 52 lies within the plane of the paper.

The advantage of the present arrangement is that the carriage can be rapidly moved between its P1, P2 and P3 positions without having to accurately locate the carriage at those particular positions. That is, it is not critical that mirrors 38 and 40 be precisely located at their P2 position along the straight line path in order to function in the manner illustrated in FIG. 2 so long as each is, in fact, positioned to intercept the image bearing beam somewhere along its length. This is because it does not matter where either of these latter mirrors intercepts the beam along its length since the mirrors are properly fixedly oriented along their entire lengths relative to the beam. This is also true for the mirrors 42 and 44 when the latter are located in their P3 position. Thus, the carriage or slide itself can be moved rapidly between its P1, P2 and P3 positions without an expensive mechanism to ensure accurate positioning. At the same time, the fixed lenses, 20, 22 and 24 and the fixed mirrors 30, 32, 34 and 36 can be initially reliably positioned from the start.

While the present invention is especially suitable for use in a high speed multi-magnification photofinishing printer, it is to be understood that it is equally applicable for use in other optical arrangements for selectively projecting images onto a projection plane in a plurality of different ways. Moreover, while the carriage has been described supporting the mirrors, 38, 40 and 42, 44 between their various positions, it is to be understood that other suitable means for fixedly interconnecting these mirrors together in the positions illustrated and actually for moving them between the various magnification positions can be readily provided. To that end, the term carriage is intended to contemplate any suitable means. Moreover, while the magnification lenses 20, 22 and 24 are illustrated as simple lenses, more complex lenses can be readily provided. Further, it should be apparent that the present invention is not limited to three different operating modes, as illustrated. Finally, it is to be understood that the present invention is not limited to arrangements in which the lenses are oriented in mutually perpendicular planes as shown in FIGS. 1, 2 and 3 or to arrangements in which the mirrors are arranged at 45 degrees to the centerline of the image bearing light beam, thus folding the light path in 90 degree increments, as shown in FIGS. 1, 2 and 3.

What is claimed is:

1. A high speed multi-magnification photofinishing printer arrangement for selectively projecting images onto a projection plane containing photographic paper at a plurality of different magnifications, said printer comprising:
   (a) means for supporting a given image bearing photographic negative;
   (b) means cooperating with said given image bearing negative when the latter is supported by said supporting means for producing a given image bearing light beam;
   (c) a plurality of spaced apart lens means, each of which is designed to project said given image bearing light beam onto the photographic paper within said projection plane at a magnification which is different than the other lens means;
   (d) means for supporting each of said lens means in a fixed position; and
   (e) light beam altering means for selectively and alternatively causing said image bearing light beam to pass through any one of said plurality of fixed lens means and onto said photographic paper, whereby to selectively and alternatively project said image bearing light beam onto said paper at any of said magnifications.

2. An arrangement according to claim 1 wherein said light beam position altering means includes light beam reflecting means and means for moving said reflecting means between a plurality of different positions corresponding in number to said plurality of lens means, each of said positions causing said reflection means to cooperate with said image bearing light beam in a way which causes said beam to pass through a different one of said lens means.

3. An arrangement according to claim 2 including two of said lens means, and wherein said moving means moves said light reflecting means between a first position entirely out of the path of said image bearing light beam, whereby to allow said light beam to pass through one of said two lens means, and a second position within the path of said image bearing light beam so a to direct the light beam through the second one of said lens means.

4. An arrangement according to claim 3 including three of said lens means, and wherein said moving means moves said light reflecting means between said first and second positions and a third position within the path of said image bearing light beam so as to direct the light beam through the third one of said lens means.

5. An arrangement according claim 4 wherein said light reflecting means includes a first set of mirrors for directing said beam through said second lens means when said moving means is in its second position and a second set of mirrors for directing said beam through said third lens means when said moving means is in its third position.

6. An arrangement according to claim 2 including two of said lens means, and wherein said moving means moves said light reflecting means between a first position within the path of said image bearing light beam so as to direct the light beam through the first one of said lens means and a second position within the path of said image bearing light beam so as to direct the light beam through the second one of said lens means.

7. An arrangement according to claim 6 wherein said light reflecting means includes a first set of mirrors for directing said beam through said first lens means when said moving means is in its first position and a second set of mirrors for directing said beam through said second lens means when said moving means is in its second position.

8. An arrangement according to claim 2 wherein said light beam reflecting means includes an array of planar mirrors all of which lie in fixed planes such that the lines formed by the intersections of these planes are parallel to one another and wherein said moving means moves said planar mirrors between said different positions along a straight line path parallel with the parallel intersection lines formed by the fixed planes of said mirrors, whereby the plane of each mirror remains unchanged irrespective of its position along said straight line path.

9. An arrangement according to claim 2 wherein said moving means includes a carriage fixedly supporting said light beam reflecting means thereon and means for moving said carriage along a straight line path between said positions.

10. An arrangement according to claim 9 wherein said light beam reflecting means includes an array of planar mirrors, all of which lie in fixed planes whose lines of intersections are parallel with said straight line path.

11. An arrangement according to claim 5 wherein all of said mirrors of both of said sets are planar mirrors, all of which lie in fixed planes such that the lines formed by the intersections of these planes are parallel to one another and wherein said moving means move said planar mirrors between said three positions along a straight line path parallel with the parallel intersection lines formed by the fixed planes of said mirrors, whereby the plane of the fixed planes of said mirrors, whereby the plane of each mirror remains unchanged irrespective of its position along said straight line path.

12. An arrangement according to claim 5 wherein said moving means includes a single carriage fixedly supporting all of said planar mirrors in their respective planes and means for moving said carriage and mirrors along said straight line path between said three positions.

13. A high speed multi-magnification photofinishing printer for selectively projecting images onto a projection plane containing photographic paper at a plurality of different magnifications, said printer comprising:
   (a) means for supporting a given image bearing photographic negative;
   (b) means cooperating with said negative when the latter is supported by said supporting means for producing a given image bearing light beam;
   (c) first, second and third magnification lens, each of which is designed to project said given image bearing light beams onto the photographic paper within said projection plane at a magnification which is different than the other two lenses;

(d) means for supporting each of said lenses in a fixed position;

(e) light beam position altering means for selectively and alternatively directing said image bearing light beam through any one of said fixed magnification lenses and onto said photographic paper, whereby to selectively and alternatively project said image bearing light beam onto said paper at any of said magnifications, said light beam position altering means including (i) a carriage, (ii) means for moving said carriage along a straight line path between first, second and third positions, and (iii) two sets of planar mirrors fixedly supported on and for movement with said carriage, all of said mirrors being disposed within planes oriented such that the lines formed by the intersections of these planes are parallel with one another and with the straight line path of movement of said carriage, said sets of mirrors being arranged on said carriage (1) so as to lie entirely outside the path of said image bearing light beam when the carriage is in said first position, whereby to allow said light beam to pass through said first lens, (2) so as to place one of said sets of mirrors in the path of said light beam when said carriage is in said second position, whereby to direct said beam through said second lens, and (3) so as to place the other of said sets of mirrors in the path of said light beam when said carriage is in said third position, whereby to direct said beam through said third lens.

14. A high speed multi-magnification photofinishing printer for selectively projecting images onto a projection plane containing photographic paper at a plurality of different magnifications, said printer comprising:

(a) means for supporting a given image bearing photographic negative;

(b) means cooperating with said given negative when the latter is supported by said supporting means for producing a given image bearing light beam;

(c) a plurality of spaced-apart magnification lenses, each of which is designed to project said given image bearing light beam onto said projection plane at a particular magnification;

(d) means for supporting each of said lens means in a fixed position; and (e) light beam position altering means for selectively and alternatively causing said image bearing light beam to pass through any one of said plurality of fixed lens means and onto said projection plane, whereby to selectively and alternatively project said image bearing light beam onto said projection plane at any of said particular magnifications, said light beam position altering means including (i) a carriage, (ii) means for moving said carriage along a straight line path between a plurality of different positions; and (iii) an array of planar mirrors fixedly supported on said carriage in planes oriented such that the lines formed by the intersections of these planes are parallel with one another and parallel with said straight line path, said mirrors cooperating with said beam in different ways when said carriage is in said different positions for selectively and alternatively causing said image bearing light beam to pass through any one of said plurality of fixed lens means and onto said projection plane.

15. An optical arrangement for selectively projecting images onto a projection plane in a plurality of different ways, said arrangement comprising:

(a) means for supporting a given image bearing member;

(b) means cooperating with said given image bearing member when the latter is supported by said supporting means for producing a given image bearing light beam;

(c) a plurality of spaced apart lens means, each of which is designed to project said given image bearing light beam onto said projection plane in ways that are different from one another;

(d) means for supporting each of said lens means in a fixed position; and (e) light beam position altering means for selectively and alternatively causing said image bearing light beam to pass through any one of said plurality of fixed lens means and onto said projection plane, whereby to selectively and alternatively project said image bearing light beam onto said projection plane in any of said different ways, said light beam position altering means including light beam reflecting means and means for moving said reflecting means between a plurality of different positions corresponding in number to said plurality of lens means, each of said positions causing said reflection means to cooperate with said image bearing light beam in a way which causes said beam to pass through a different one of said lens means, said light beam reflecting means including an array of planar mirrors all of which lie in fixed planes such that the lines formed by the intersections of these planes are parallel to one another and wherein said moving means moves said planar mirrors between said different positions along a straight line path parallel with the parallel intersection lines formed by the fixed planes of said mirrors, whereby the plane of each mirror remains unchanged irrespective of its position along said straight line path.

16. An arrangement according to claim 15 wherein said arrangement is a high speed photofinishing printer, wherein said image bearing member is a photographic negative, and wherein said plurality of lens means are designed to project said given image onto said projection plane at different magnifications.

17. An optical arrangement for selectively projecting images onto a projection plane in a plurality of different ways, said arrangement comprising:

(a) means for supporting a given image bearing member;

(b) means cooperating with said given image bearing member when the latter is supported by said supporting means for producing a given image bearing light beam;

(c) three spaced apart lens means, each of which is designed to project said given image bearing light beam onto said projection plane in ways that are different from one another;

(d) means for supporting each of said lens means in a fixed position; and (e) light beam position altering means for selectively and alternatively causing said image bearing light beam to pass through any one of said plurality of fixed lens means and onto said projection plane, whereby to selectively and alternatively project said image bearing light beam onto said projection plane in any of said different ways, said light beam position altering means including light beam reflecting means and means for moving said reflecting means between a plurality of different positions corresponding in number to said plurality of lens means, each of said positions causing said reflection means to cooperate with said image bearing light beam in a way which causes said beam to pass through a different one of said lens means, said moving means moving said light reflecting means between a first position entirely out of the path of, said image bearing light beam, whereby to allow said light beam to pass through one of said three lens means, a second position within the path of said image bearing light beam so as to direct the light beam through a second one of said lens means, and a third position within the path of said image bearing light beam so as to direct the light beam through the third one of said lens means, said light reflecting means including a first set of mirrors for directing said beam through said second lens means when said moving means is in its second position and a second set of mirrors for directing said beam through said third lens means when said moving means is in its third position, all of said mirrors of both of said sets of planar mirrors, all of which lie in fixed planes and wherein said moving means moves said planar mirrors between said three positions along a straight line path parallel with the parallel intersection lines formed by the fixed planes of said mirrors, whereby the plane of each mirror remains unchanged irrespective of its position along said straight line path.

18. An arrangement according to claim 17 wherein said moving means includes a single carriage fixedly supporting all of said planar mirrors in their respective planes and means for moving said carriage and mirrors along said straight path between said three positions.

19. An optical arrangement for selectively projecting images onto a projection plane in a plurality of different ways, said arrangement comprising:
(a) means for supporting a given image bearing member;
(b) means cooperating with said given image bearing member when the latter is supported by said supporting means for producing a given image bearing light beam;
(c) a plurality of spaced apart lens means, each of which is designed to project said given image bearing light beam onto said projection plane in ways that are different from one another;
(d) means for supporting each of said lens means in a fixed position; and
(e) light beam position altering means for selectively and alternatively causing said image bearing light beam to pass through any one of said plurality of fixed lens means and onto said projection plane, whereby to selectively and alternatively project said image bearing light beam onto said projection plane in any of said different ways, said light beam position altering means including light beam reflecting means and means for moving and reflecting means between a plurality of different positions corresponding in number to said plurality of ones means, each of said positions causing said reflection means to cooperate with said image bearing light beam in a way which causes said beam to pass through a different one of said lens means, said moving means includes a carriage fixedly supporting said light beam reflecting thereon and means for moving said carriage along a straight line path between said positions, said light beam reflecting means including an array of planar mirrors, all of which lie in fixed planes whose lines of intersection are parallel with said straight line path.

* * * * *

UNITED STATES PATENT AND TRADEMARK OFFICE
CERTIFICATE OF CORRECTION

PATENT NO. : 5,220,378
DATED : June 15, 1993
INVENTOR(S) : David H. Kirkpatrick and Jack C. DeMarti, Jr.

It is certified that error appears in the above-identified patent and that said Letters Patent are hereby corrected as shown below:

Col. 5, line 36      Insert --position-- between "beam" and "altering"

Col. 9, line 17      Delete "," at end of sentence

Col. 10, line 29     "ones" should read --lens--

Signed and Sealed this

Twenty-fifth Day of January, 1994

Attest:

BRUCE LEHMAN

Attesting Officer    Commissioner of Patents and Trademarks